(12) United States Patent
Cone et al.

(10) Patent No.: US 8,833,746 B2
(45) Date of Patent: Sep. 16, 2014

(54) MULTI-PURPOSE VACUUM CLAMP TABLE

(75) Inventors: Michael Cone, Kihei, HI (US); Darien Brookfield Crane, Honolulu, HI (US); James Wagner, Menlo Park, CA (US)

(73) Assignee: Vibration Technologies, LLC, San Rafael, CA (US)

( * ) Notice: Subject to any disclaimer, the term of this patent is extended or adjusted under 35 U.S.C. 154(b) by 503 days.

(21) Appl. No.: 13/168,725

(22) Filed: Jun. 24, 2011

(65) Prior Publication Data

US 2012/0018938 A1 Jan. 26, 2012

Related U.S. Application Data

(60) Provisional application No. 61/358,855, filed on Jun. 25, 2010.

(51) Int. Cl.
*B25B 11/00* (2006.01)
*B23Q 3/00* (2006.01)

(52) U.S. Cl.
CPC .................................. *B25B 11/005* (2013.01)
USPC ........................................ 269/21; 269/289 R

(58) Field of Classification Search
USPC ............ 269/21, 903, 289 R; 108/144.11, 147, 108/147.19, 83, 84, 92, 94–96, 106; D21/312, 318, 324, 325, 328; 278/108.1, 309
See application file for complete search history.

(56) References Cited

U.S. PATENT DOCUMENTS

| | | | | |
|---|---|---|---|---|
| 505,602 | A | * | 9/1893 | Jackson ........................... 108/95 |
| 5,722,646 | A | * | 3/1998 | Soderberg et al. .............. 269/20 |
| 2006/0157905 | A1 | * | 7/2006 | Lenzini ........................... 269/21 |

* cited by examiner

*Primary Examiner* — Lee D Wilson
*Assistant Examiner* — Nirvana Deonauth
(74) *Attorney, Agent, or Firm* — Patterson & Sheridan, LLP

(57) ABSTRACT

In one embodiment, an apparatus for constraining an object includes a first clamping surface configured to apply a first holding force to a first surface of the object; a second clamping surface configured to apply a second holding force to a second surface of the object; and an actuator configured to selectively move the second clamping surface relative to the first clamping surface.

13 Claims, 5 Drawing Sheets

MULTI-PURPOSE VACUUM CLAMP TABLE

REFERENCE TO RELATED APPLICATIONS

The application claims benefit of U.S. Provisional Patent Application No. 61/358,855, filed Jun. 25, 2010, which application is incorporated herein by reference in its entirety.

BACKGROUND OF THE INVENTION

1. Field of the Invention

The invention relates generally to vibrational analysis and, more specifically, to a multi-purpose vacuum clamp table.

2. Description of the Related Art

Vibrational modal analysis can be accomplished by constraining at least one degree of freedom of a structure and introducing a forcing function to the structure. Generally, one or more control points on a structure are constrained to a fixed acceleration.

In the manufacture of structures where harmonic resonance is an important characteristic, it is necessary to provide fixtures that constrain a work piece in a certain manner to test for resonant frequencies. In a typical manufacturing cycle, the resonant frequencies of a work piece are first measured. Then, precise machining operations make changes to the work piece in response to the measured resonant frequencies. Finally, the vibrational modal analysis is checked again to determine if the structure has the correct harmonic resonance.

One drawback to this approach is that machining operations require the fixture to provide a rigid base to constrain movement of the work piece during machining. However, accurate vibrational modal analysis requires uniform clamping characteristics on the boundary of the work piece, such as along the perimeter. Traditionally, this would be accomplished by moving the work piece between different fixtures for each of the operations. Changing the fixtures between phases takes time and reduces the manufacturing efficiency for creating the finished products. For example, with each change of the fixtures between phases, the boundary constraints on the work piece for vibrational modal analysis are also changed.

As the foregoing illustrates, what is needed in the art is a fixture that can be configured to constrain a work piece with one set of constraints and efficiently reconfigured to constrain the work piece with a second set of constraints.

SUMMARY OF THE INVENTION

In one embodiment, an apparatus for constraining an object includes a first clamping surface configured to apply a first holding force to a first surface of the object; a second clamping surface configured to apply a second holding force to a second surface of the object; and an actuator configured to selectively move the second clamping surface relative to the first clamping surface.

In another embodiment, a method of constraining an object includes applying a first holding force to the object to hold the object against a first clamping surface; performing a first vibrational modal analysis on the object; applying a second holding force to the object to hold the object against a second clamping surface; changing a resonant characteristic of the object; releasing the second clamping surface from the object; and performing a second vibrational modal analysis on the object.

In another embodiment, a method of constraining an object includes applying a first holding force to the object to hold the object against a first clamping surface; applying a second holding force to the object to hold the object against a second clamping surface; and moving the second clamping surface relative to the first clamping surface. The second clamping surface may be moved to a coplanar position with the first clamping surface.

BRIEF DESCRIPTION OF THE DRAWINGS

So that the manner in which the above recited features of the present invention, and other features contemplated and claimed herein, are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

The preferred embodiment of the multi-purpose vacuum clamp table according to the present invention is illustrated in the attached FIGS. 1-5. The multi-purpose vacuum clamp table 100 may be used with a machine for performing vibrational modal analysis of a musical instrument soundboard.

Figure 1:
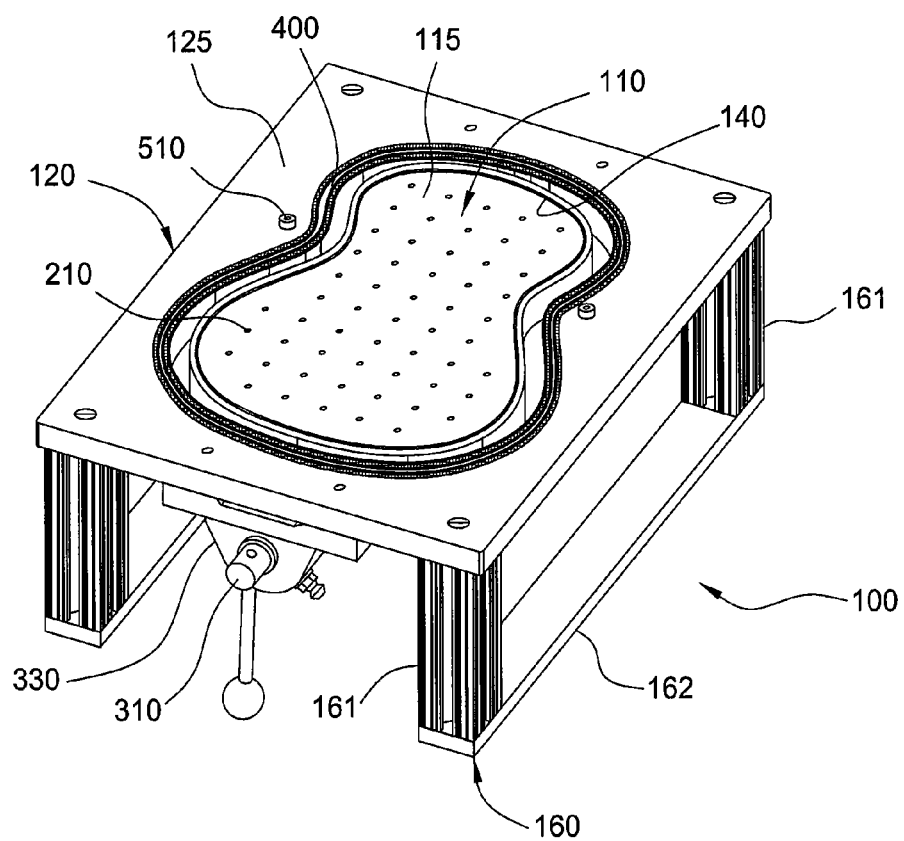
FIG. 1 is a perspective view of an embodiment of vacuum clamp table.
Figure 2A:
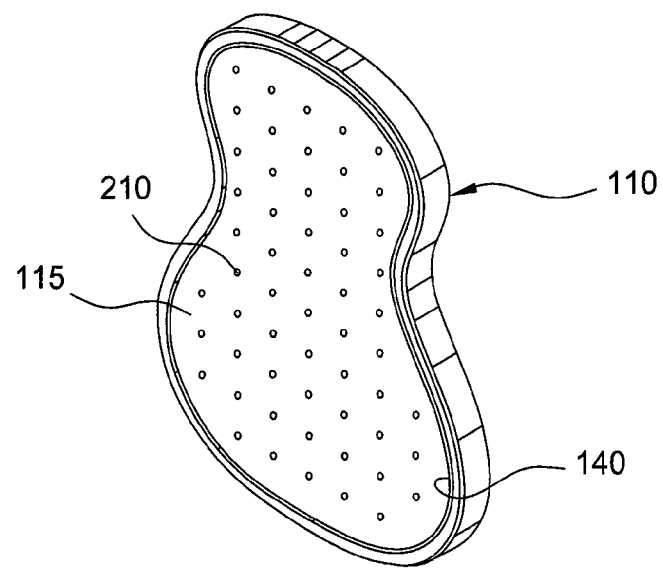
FIGS. 2A-B are perspective views of an inner machined plate of the vacuum clamp table of FIG. 1.
Figure 2B:
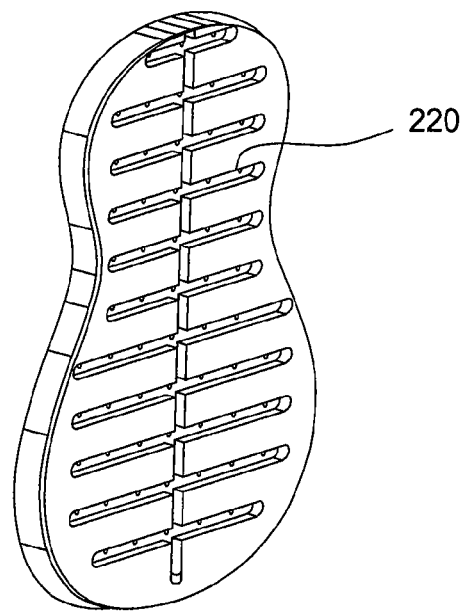

In the preferred embodiment, the multi-purpose vacuum clamp table 100 comprises 6 components. The multi-purpose vacuum clamp table 100 is illustrated in FIG. 1. The first component is an inner vice assembly 110 that includes an inner machined plate 115 used for applying a clamping force to a work piece. The top surface of the inner vice assembly 110 has an array of holes 210 drilled through the inner machined plate 115 that connect to a series of channels 220 on the back side of the plate 115. The front and back surfaces of the inner machined plate 115 are illustrated in FIGS. 2A and 2B, respectively. A back-plate (not shown) is attached to the back surface of the inner machined plate 115 to seal the channels 220 of the inner machined plate 115.

Figure 4:
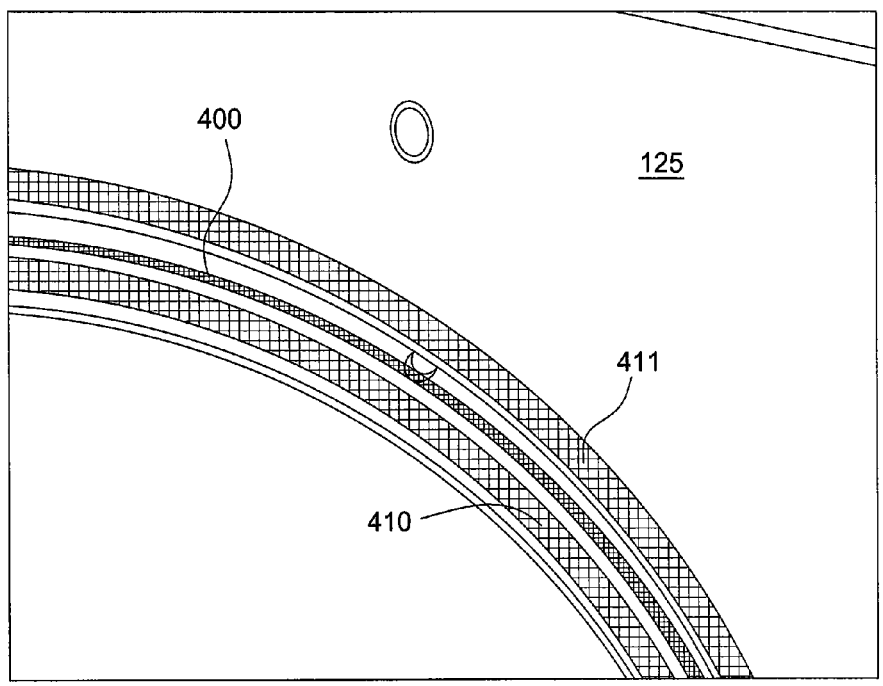
FIG. 4 is an enlarged partial view of an outer machined plate of the vacuum clamp table of FIG. 1.
Figure 5:
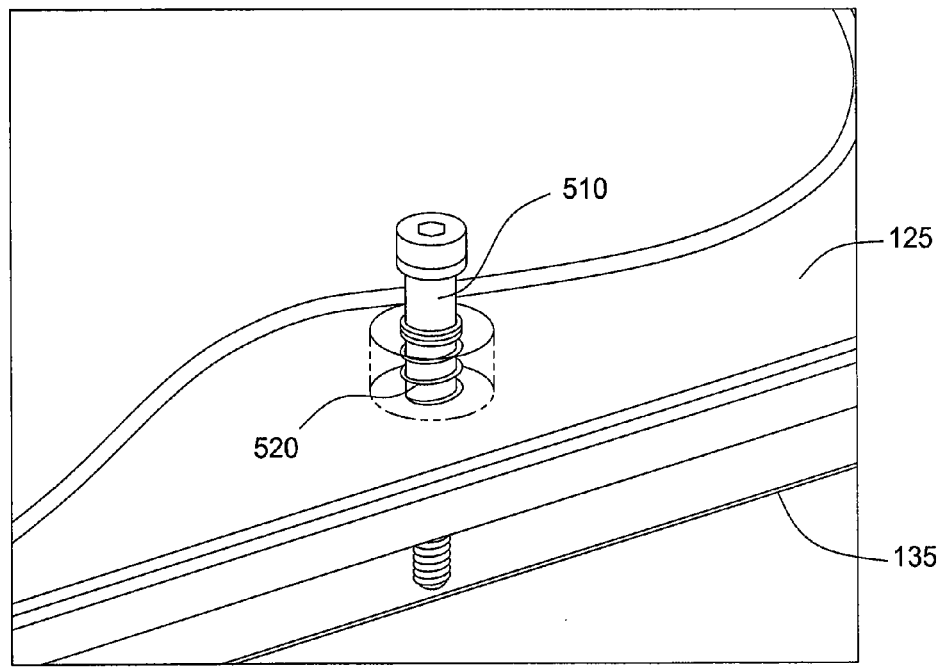
FIG. 5 shows a bolt and a compensating spring of the vacuum clamp assembly of FIG. 1.

The second component is the outer vice assembly 120. The outer vice assembly 120 includes an outer machined plate 125 configured with a cutout in the center of the outer machined plate 125 in the shape of the inner vice assembly 110. The outer vice assembly 120 has a vacuum channel 400 cut into the top of the outer machined plate 125. The vacuum channel 400 may be disposed around the perimeter of the cutout. In one embodiment, the machined vacuum channel 400 is concentric to the cutout in the outer machined plate 125, as illustrated in FIG. 4. Two shoulder bolts 510 and compensating springs 520 connect the outer machined plate 125 of the outer vice assembly 120 to a support plate 135 of the outer vice assembly 120, as illustrated in FIG. 5. The compensating springs 520 force the support plate 135 of the outer vice assembly 120 to rest against the cam lobes 320 of a camshaft 310. Although the inner vice assembly 110 is shown to be substantially similar in shape to the cutout in the outer vice assembly 120, it is contemplated that the inner vice assembly 110 may have a different shape from the cutout so long as it provides sufficient support to the work piece during the machining process.

Figure 3:
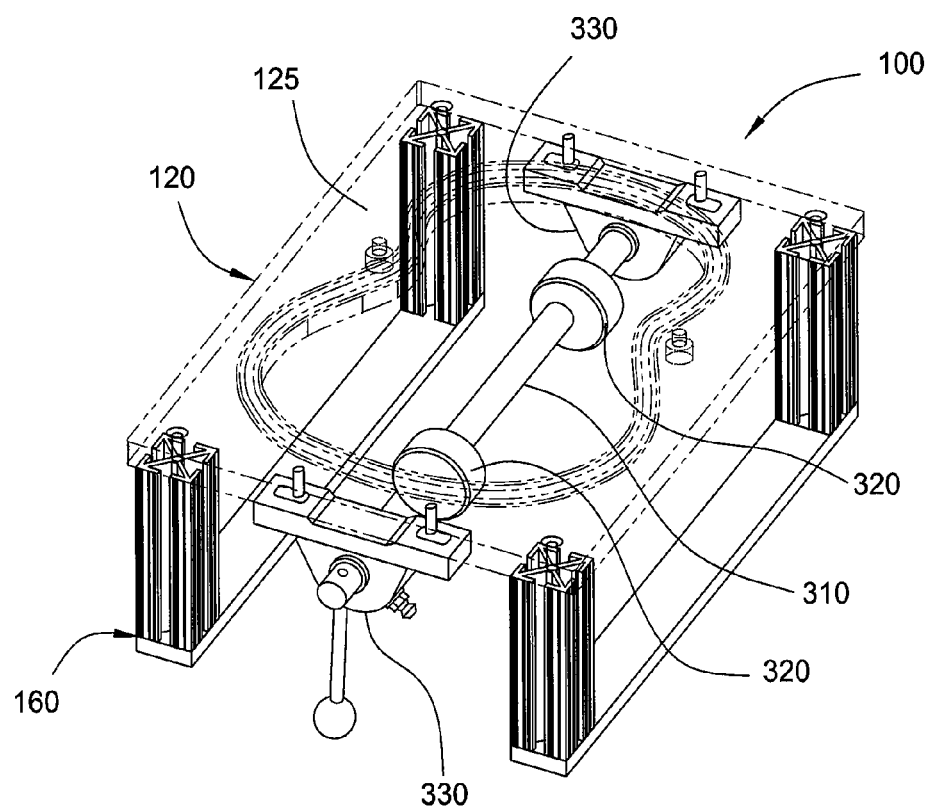
FIG. 3 is another perspective view of the vacuum clamp table of FIG. 1.

The third and fourth components are a camshaft 310 assembly and two bearing housings 330, respectively. FIG. 3 is an illustration of an isometric view of the multi-purpose vacuum clamp table 100 with a hidden inner vice assembly 110 and a transparent outer vice assembly 120. The camshaft 310 and the cam lobes 320 are used to move the inner vice assembly 110 relative to the outer vice assembly 120. The camshaft 310 is constrained by two bearing housings 330 bolted to the bottom surface of the outer machined plate 125 of the outer vice assembly 120. Two cam lobes 320 are attached to the camshaft 310. The cam lobes 320 ride against the bottom surface of the support plate 135 of the outer vice assembly 120. The inner vice assembly 110 is located in the cutout in the outer machined plate 125 of the outer vice assembly 120 and rests on top of the support plate 135 of the outer vice assembly 120. When the camshaft 310 is rotated to its top-dead-center position, the top surface of the inner vice assembly 110 is coplanar to the top surface of the outer vice assembly 120. When the camshaft 310 is rotated to its bottom-dead-center position, the top surface of the inner vice assembly 110 is below the top surface of the outer vice assembly 120. The support plate 135 is configured to limit movement of the inner vice assembly 110 to a predetermined height, such as when the inner vice assembly 110 is coplanar with the outer vice assembly 120. In one embodiment, the support plate 135 may be in the shape of a rectangle having dimensions larger than the cutout. The support plate 135 may contact the bottom of the outer machined plate 125 to prevent the inner vice assembly 110 rising higher, thereby ensuring the top surface of the inner vice assembly 110 is coplanar with the outer vice assembly 120.

In alternative embodiments, alternative mechanisms for actuating the inner vice assembly 110 are contemplated. For example, the inner vice assembly 110 could be actuated by a screw, bellows, pneumatic or hydraulic cylinders, or any other mechanism that could raise and lower the inner vice assembly 110 in relation to the outer vice assembly 120.

The fifth components are gaskets used to seal the vacuum clamp surfaces of the inner and outer vice assemblies 110, 120. FIG. 4 is an enlarged partial view of the outer machined plate 125 of the outer vice assembly 120. As shown, a gasket 410, 411 is placed in concentric channels on both sides of the vacuum channel 400 of the outer vice assembly 120. In the preferred embodiment, the gaskets 410, 411 are made of a conventional vacuum gasket material having a rectangular cross-section. In alternative embodiments, other suitable sealing materials for vacuum sealing and different cross-sections may be employed, such as gaskets with a circular cross-section. The vacuum channel 400 is connected to a vacuum pressure through a fitting in the back of the outer machined plate 125 of the outer vice assembly 120. The gaskets 410, 411 provide a seal between the top surface of the outer vice assembly 120 and a work piece placed on top of the outer vice assembly 120. A third gasket 140, of similar construction, is shown in FIG. 1 and FIG. 2A around the outer edge of the inner vice assembly 110. The third gasket 140 provides a seal between the top surface of the inner vice assembly 110 and a work piece placed on top of the inner vice assembly 110.

The sixth component is the frame structure that connects to the bottom of the outer vice assembly 120. In the preferred embodiment of FIG. 1, the frame 160 includes of four vertical legs 161 and two base cross-members 162. A front leg 161 is connected to one of the back legs 161 by either end of one of the base cross-members 162. The four legs 161 are connected with bolts to the bottom surface of the outer machined plate 125 of the outer vice assembly 120. Other suitable frame structures suitable for supporting the inner and outer vice assemblies 110, 120 are also contemplated.

In the preferred embodiment, the multi-purpose vacuum clamp table 100 is used as a fixture in a manufacturing process that includes a first testing stage, a machining stage, and a second testing stage. In the first testing stage, a vibration modal analysis is performed on a work piece clamped to the multi-purpose vacuum clamp table 100. The camshaft 310 is rotated to the bottom-dead-center position, causing the top surface of the inner vice assembly 110 to drop below the top surface of the outer vice assembly 120. A vacuum pressure is applied to the vacuum channel 400 in the outer vice assembly 120 to clamp the work piece to the outer vice assembly 120 around the perimeter edge of the work piece. The work piece does not touch the inner vice assembly 110 when the inner vice assembly 110 is in the lowered position. Therefore, the clamp table 100 is optimally configured for performing vibrational modal analysis by placing uniform constraints along the perimeter of the work piece while leaving the lower surface of the work piece unconstrained.

Next, vibrational modal analysis is performed to determine if machining operations are required to change the resonant characteristics of the work-piece. If the results of the vibrational modal analysis determine a change to the resonant characteristics of the work piece is necessary, then the machining stage is performed. Initially, a machinist rotates the camshaft 310 to its top-dead-center position. The support plate 135 of the outer vice assembly 120 and the inner vice assembly 110 are moved up such that the top surface of the inner vice assembly 110 is coplanar with the top surface of the outer vice assembly 120. A vacuum pressure connected to the inner vice assembly 110 is switched on so that the work piece is clamped to the top surface of the inner vice assembly 110. The work piece is now clamped to both the inner and the outer vice assemblies 110, 120. The top surface of the inner vice assembly 110 and the top surface of the outer vice assembly 120 provide a rigid, coplanar support for the work piece during machining operations.

After the machining operations are complete, the vacuum is disconnected from the inner vice assembly 110, thereby releasing the clamping force between the work piece and the inner vice assembly 110. The machinist rotates the camshaft 310 to its bottom-dead-center position, thereby lowering the top surface of the inner vice assembly 110 below the top surface of the outer vice assembly 120. Subsequently, a second vibrational modal analysis is performed to check the new resonant characteristics of the work piece.

By not disconnecting the vacuum pressure from the outer vice assembly 120 during the test-machine-test cycle, the boundary constraints on the work piece are maintained throughout the cycle. Therefore, the second vibrational modal analysis is performed using the same boundary conditions as the first vibrational modal analysis. This allows for accurate comparison of the results of the second vibrational analysis to the results of the first vibrational analysis. However, it is contemplated that the clamp table may be used for one or more of the two testing phases and the machine phase.

While the foregoing is directed to embodiments of the invention, other and further embodiments of the invention may be devised without departing from the basic scope thereof, and the scope thereof is determined by the claims that follow.

What is claimed is:

1. An apparatus for constraining an object, the apparatus comprising:
    a first clamping surface configured to apply a first holding force to a first surface of the object;
    a second clamping surface configured to apply a second holding force to a second surface of the object, wherein the second clamping surface is disposed within a cutout of the first clamping surface, and wherein the first holding force and the second holding force comprise vacuum suction; and
    an actuator configured to selectively move the second clamping surface relative to the first clamping surface from a coplanar position to a non-planar position.

2. The apparatus of claim 1, wherein the second holding force is applied to the second surface of the object when the second clamping surface is coplanar with the first clamping surface.

3. The apparatus of claim 1, wherein the first clamping surface includes a vacuum channel for applying the first holding force.

4. The apparatus of claim 3, wherein the first holding force is applied along a perimeter of the object.

5. The apparatus of claim 3, further comprising a sealing member disposed adjacent the vacuum channel.

6. The apparatus of claim 3, wherein the second clamping surface includes a hole for applying the second holding force.

7. The apparatus of claim 6, further comprising a sealing member disposed around the hole.

8. The apparatus of claim 1, further comprising a support member coupled to the first clamping surface and configured to support the second clamping surface.

9. The apparatus of claim 8, wherein the support member is actuated by the actuator.

10. An apparatus for constraining an object, the apparatus comprising: a first clamping surface configured to apply a first holding force to a first surface of the object, wherein the first holding force comprises vacuum suction; a second clamping surface configured to apply a second holding force to a second surface of the object, wherein the second clamping surface is disposed within a cutout of the first clamping surface, and wherein the second holding force comprises vacuum suction; an actuator configured to selectively move the second clamping surface relative to the first clamping surface; a support member coupled to the first clamping surface and configured to support the second clamping surface; wherein the support member is actuated by the actuator; and a biasing member configured to bias the support member against the actuator.

11. The apparatus of claim 1, wherein the actuator comprises a cam shaft and a cam lobe.

12. The apparatus of claim 1, wherein the actuator is selected from the group consisting of a screw, bellows, pneumatic cylinder, and hydraulic cylinder.

13. The apparatus of claim 1, wherein the second holding force is capable of being disengaged while the first holding force is maintained.

* * * * *